United States Patent
Senescu et al.

(10) Patent No.: US 9,558,525 B2
(45) Date of Patent: Jan. 31, 2017

(54) PROCESS COMMUNICATION METHOD AND SYSTEM

(75) Inventors: Reid Robert Senescu, Stanford, CA (US); John Riker Haymaker, San Francisco, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 13/253,924

(22) Filed: Oct. 5, 2011

(65) Prior Publication Data

US 2012/0169710 A1 Jul. 5, 2012

Related U.S. Application Data

(60) Provisional application No. 61/390,324, filed on Oct. 6, 2010.

(51) Int. Cl.
| | |
|---|---|
| *G06T 1/00* | (2006.01) |
| *G06T 15/00* | (2011.01) |
| *G06T 19/00* | (2011.01) |
| *G06T 11/00* | (2006.01) |

(52) U.S. Cl.
CPC ............... *G06T 1/00* (2013.01); *G06T 15/005* (2013.01); *G06T 11/001* (2013.01); *G06T 19/00* (2013.01)

(58) Field of Classification Search
CPC ....... G06T 15/005; G06T 19/00; G06T 11/001
See application file for complete search history.

(56) References Cited

U.S. PATENT DOCUMENTS

| 5,608,789 | A * | 3/1997 | Fisher et al. ............. 379/201.03 |
| 6,792,595 | B1 * | 9/2004 | Storistenau et al. .......... 717/110 |
| 7,913,044 | B1 * | 3/2011 | Desai et al. .................. 711/162 |
| 2006/0173873 | A1 * | 8/2006 | Prompt et al. ................ 707/100 |
| 2008/0270450 | A1 * | 10/2008 | Veitch et al. ................. 707/102 |
| 2009/0177863 | A1 * | 7/2009 | Rehman et al. ................ 712/30 |
| 2009/0282395 | A1 * | 11/2009 | Petev et al. .................. 717/166 |
| 2010/0281071 | A1 * | 11/2010 | Ben-Zvi et al. ............. 707/803 |
| 2011/0082870 | A1 * | 4/2011 | Ogikubo et al. ............. 707/756 |
| 2011/0161430 | A1 * | 6/2011 | Callanan et al. ............ 709/206 |

OTHER PUBLICATIONS

Collberg et al. (Journal Paper: "A system for graph-based visualization of the evolution of software", Proceeding SoftVis '03 Proceedings of the 2003 ACM symposium on Software visualization pp. 77-ff ACM New York, NY, USA ©2003).*

(Continued)

*Primary Examiner* — James A Thompson
*Assistant Examiner* — Tapas Mazumder
(74) *Attorney, Agent, or Firm* — KPPB LLP

(57) ABSTRACT

An embodiment of the invention is implemented in a web browser that facilitates the visualization of dependencies between digital information and situations where changes in one piece of information or project can affect another. In such an embodiment, the user is presented with two personalized home page windows: a hierarchy view and a graph view. The hierarchy view is used to navigate through a hierarchy of documents or other digital information. The graph view is used to graphically display certain dependencies and is further used to graphically display changes to any dependencies.

29 Claims, 9 Drawing Sheets

(56) References Cited

OTHER PUBLICATIONS

Khanna et al., "Strategies That Fit Emerging Markets", Harvard Business Review, 2005, 83(6), 15 pgs.
Koskela, Lauri, "Application of the New Production Philosophy to Construction", Stanford University, Center for Integrated Facility Engineering, Technical Report 72, 1992, 87 pgs.
Krafcik, John F., "Triumph of the Lean Production System", Sloan Management Review, 1998, 30(1), 41-52.
Kreiner, Kristian, "Tacit knowledge management: The role of artifacts", Journal of Knowledge Management 6(2), 112-123 (2002).
Lee et al., "Product data modeling using GTPPM—A case study", Automation in Construction, 2007, 16(3), 392-407.
Leite et al., "Analysis of modeling effort and impact of different levels of detail in building information models", Automation in Construction, 20(5), 601-609 (2011).
Malone et al., "Tools for Inventing Organizations: Toward a Handbook of Organizational Processes", Management Science, 1999, 45(3), 425-443.
Marsh et al., "Measuring the costs and benefits of information technology in construction", Engineering, Construction and Architectural Management 7(4), 423-435 (2000).
Nickerson et al., "Diagrams as Tools in the Design of Information Systems", Design Computing and Cognition, J.S. Gero and A. K. Goel (eds), 2008, 103-122.
Paulson, Boyd C., "Designing to Reduce Construction Costs", Journal of the Construction Division, 1976, 102(4), 587-592.
Pracht, William E., "GISMO: A Visual Problem-Structuring and Knowledge-Organization Tool", IEEE Transactions on Systems, Man and Cybernetics, 1986, 16(2), 265-270.
Regli et al., "A survey of design rationale systems: Approaches, representation, capture and retrieval", Engineering with Computers, 16(3-4), 209-235 (2000).
Senescu, Reid R., "Design Process Communication Methodology", PhD Dissertation, Stanford University, Stanford, CA, 2011, 167 pgs.
Senescu et al., "Evaluating and improving the effectiveness and efficiency of design process communication", Advanced Engineering Informatics 27, 299-313 (2012).
Senescu et al., "Generating a network of information dependencies automatically", Proc., 14th Int. Dependency and Struct. Modelling Conf., 139-144 (2012).
Senescu et al., "Relationships Between Project Complexity and Communication", Stanford University, Center for Integrated Facility Engineering, Stanford, CA, Technical Report 196, 2011, 37 pgs.
Shen et al., "Systems integration and collaboration in architecture, engineering, construction, and facilities management: A review", Adv. Eng. Inform., 24(2), 196-207 (2010).
Simon, Herbert A., "Cognitive Science: The Newest Science of the Artificial", Cognitive Science, 1980, 4(1), 33-46.
Singh et al., "A theoretical framework of a BIM-based multi-disciplinary collaboration platform", Automation in Construction 20(2), 134-144 (2011).
Steward, Donald V., "The Design Structure System: A Method for Managing the Design of Complex Systems", IEEE Transactions on Engineering Management, 1981, 28(3), 71-74.
Strong et al., "Report on Integrated Practice", American Institute of Architects, Washington D.C., 15 pgs. (2006).
Tang et al., "Product design knowledge management based on design structure matrix", Advanced Engineering Informatics 24(2), 159-166 (2010).
Tobias et al.,"A Model-Based LCA Process on Stanford University's Green Dorm", International Life Cycle Assessment and Management Conference, Portland, Oregon, Oct. 2 to 4, 2007, 19 pgs.
Winograd, Terry, "Shifting viewpoints: Artificial intelligence and human—computer interaction", Artificial Intelligence, 2006, 170(18), 1256-1258.
Wix, J., "Information Delivery Manual: Guide to Components and Development Methods", buildingSMART, Norway, 2007, 77 pgs.
Young, et al., "Interoperability in the Construction Industry", SmartMarket Report: Design & Construction Intelligence, McGraw Hill Construction , 2007, 36 pgs.
American Institute of Architects, "Integrated Project Delivery—A Working Definition", McGraw Hill Construction, May 15, 2007, 17 pgs.
Austin et al., "A data flow model to plan and manage the building design process", Journal of Engineering Design 7(1), 15 pgs. (1996).
Austin et al., "Analytical design planning technique (ADePT): a dependency structure matrix tool to schedule the building design process", Construction Management and Economics, 2000, 18(2), 173-182.
Austin et al., "Analytical Design Planning Technique: a model of the detailed building design process", Design Studies, 1999, 20(3), 279-296.
Baldwin et al., "Planning building design by simulating information flow", Automation in Construction 8(2), 149-163 (1998).
Ballard, Glenn, "Can Pull Techniques Be Used in Design Management?", Proceedings of the Conference on Concurrent Engineering in Construction, Helsinki, Finland, 1999, 18 pgs.
Ballard, Glenn, "Positive vs Negative Iteration in Design", 8th Annual Conference of the International Group for Lean Construction, Brighton, UK, 2000, 12 pgs.
Ballard et al., "On the Agenda of Design Management Research", 6th Annual Conference of the International Group for Lean Construction, Guaruja, Brazil, 1998, 13 pgs.
Benkler, Yochai, "Coase's Penguin, or, Linux and the Nature of the Firm", Yale Law Journal, 2002, 112(3), 369-446.
Carrillo et al., "Exploiting knowledge management: the engineering and construction perspective", Journal of Management in Engineering, 2006, 22 (1), pp. 2-10.
Choo et al., "DePlan: A Tool for Integrated Design Management", Automation in Construction, 2004, 13(3), 313-326.
Clevenger et al., "Metrics to Assess Design Guidance", Stanford University, Center for Integrated Facility Engineering, Technical Report 19, 2011, 28 pgs.
Coase, R. H., "The Nature of the Firm", Economica, 1937, 4(16), 386-405.
Conklin, Jeff, "Designing Organizational Memory: Preserving Intellectual Assets in a Knowledge Economy", CogNexus Institute, 1996, 41 pgs.
Conklin et al., "A process-oriented approach to design rationale", Human Computer Interaction 6, 357-391 (1991).
Ding et al., "Component-based records: A novel method to record transaction design work", Advanced Engineering Informatics 23(3), 332-347 (2009).
Dossick et al., "Organizational Divisions in BIM-Enabled Commercial Construction", Journal of Construction Engineering and Management, 2010, 136(4), 459-467.
Eckert et al., "Information flow in engineering companies: problems and their cases", International Conference on Engineering Design, 43-50 (2001).
Eppinger, Steven D., "Model-based Approaches to Managing Concurrent Engineering", Journal of Engineering Design, 1991, 2(4), 283-290.
Fisher, Norman, "The use of structured data analysis as a construction management research tool: 1. The technique", Construction Management and Economics 8(4), 341-363 (1990).
Flager et al., "Multidisciplinary Process Integration and Design Optimization of a Classroom Building", Journal of Information Technology in Construction, 2009, 14, 595-612.
Ford et al., "The Role of Conversations in Producing Intentional Change in Organizations", The Academy of Management Review, 1995, 20(3), 541-570.
Fuks et al., "Inter- and intra-relationships between communication coordination and cooperation in the scope of the 3C collaboration model", Proc., 12th Int. Conf. on Comp. Supported Cooperative Work in Des., Pontifical Catholic Univ., Rio de Janeiro, Brazil, 148-153 (2008).
Gane et al., "Benchmarking Current Conceptual High-Rise Design Processes", Journal of Architectural Engineering, 2010, 16(3), 100-111.

(56) References Cited

OTHER PUBLICATIONS

Garcia et al., "Building a project ontology with extreme collaboration and virtual design and construction", Advanced Engineering Informatics, 2004, 18(2), 71-83.
Grant, Robert M., "Toward a Knowledge-Based Theory of the Firm", Strategic Management Journal, 1996, 17, 109-122.
Hansen et al., "What's Your Strategy for Managing Knowledge?", Harvard Business Review, 1999, 77(2), 106-116.
Hargadon et al., "Building an Innovation Factory", Harvard Business Review, May-Jun. 2000 Issue, retrieved from https://hbr.org/2000/05/building-an-innovation-factory-2, 16 pgs.
Hartmann et al., "Implementing information systems with project teams using ethnographic—action research", Advanced Engineering Informatics, 2008 (Article in Press), doi:10.1016/j.aei.2008.06.006.
Haymaker, John, "Communicating, integrating and improving multidisciplinary design narratives", J. S. Gero, ed., Second International Conference on Design Computing and Cognition, Springer, Netherlands, 635-653 (2006).
Haymaker et al., "Framework for measuring the rationale clarity of AEC design decisions", Journal of Architectural Engineering 17(3), 86-96 (2011).
Haymaker et al., "Measuring and Improving Rationale Clarity in a University Office Building Design Process", Journal of Architectural Engineering, in press, 2011, 30 pgs.
Haymaker et al., "Perspectors: composable, reusable reasoning modules to construct an engineering view from other engineering views", Advanced Engineering Informatics, 2004, 18(1), 49-67.
Heer et al., "Voyagers and Voyeurs: Supporting Asynchronous Collaborative Visualization", Computer Human Interaction, Association for Computing Machinery, San Jose, CA, 2007, 1029-1038.
Howell, Gregory A., "What Is Lean Construction", 7th Annual Conference of the International Group for Lean Construction, University of California, Berkeley, CA, 1999, 1-10.
Ipek et al., "Efficiently Exploring Architectural Design Spaces via Predictive Modeling", Proceedings of the 12th International Conference on Architectural Support for Programming Languages and Operating Systems, Association for Computing Machinery, New York, NY, 2006, 195-206.
Ishino et al., "An information value based approach to design procedure capture", Advanced Engineering Informatics, 2006, 20(1), 89-107.
Ishino et al., "Estimate design intent: a multiple genetic programming and multivariate analysis based approach", Advanced Engineering Informatics, 2002, 16(2), 107-125.
Javernick-Will et al., "Mobilizing institutional knowledge for international projects", Journal of Construction Engineering and Management, 136(4), 430-441 (2010).
Javernick-Will et al., "Mobilizing knowledge for international projects", Proceedings of the 2008 ASCE LEED Conference, CIB Task Group 64 and ASCE Construction Research Council, Lake Tahoe, CA, 18 pgs. (2008).
Jin et al., "The Virtual Design Team: A Computational Model of Project Organizations", Computational and Mathematical Organization Theory, 1996, 2(3), 171-195.
Kam et al.,"Capitalizing on early project decision-making opportunities to improve facility design, construction, and life-cycle performance—POP, PM4D, and decision dashboard approaches", Automation in Construction 13(1), 53-65 (2004).
Kelley et al., "Critical-Path Planning and Scheduling", Papers Presented at the Dec. 1-3, 1959, Eastern Joint IRE-AIEE-ACM Computer Conference, Association for Computing Machinery, Boston, MA, 160-173.

* cited by examiner

PROCESS COMMUNICATION METHOD AND SYSTEM

CROSS-REFERENCE TO RELATED APPLICATION

The current application claims the benefit of U.S. Provisional Patent Application Ser. No. 61/390,324 entitled "File Sharing by Relationships" to Senescu et al., filed Oct. 6, 2010. The disclosure of U.S. Provisional Patent Application Ser. No. 61/390,324 is hereby incorporated by reference in its entirety.

FIELD OF THE INVENTION

The present invention generally relates to computerized methods and systems for design process communication.

BACKGROUND OF THE INVENTION

Design processes are often under-productive. The design process management research field addresses this lack of productivity through the design rationale and design process improvement research. Researchers in these fields attempt to improve design processes by first validating descriptive and predictive process modelling methods using industry observation and case studies, which then lay the foundation for normative research proposing new methods aimed at directly improving industry design processes. These new methods frequently depend on process communication to improve design processes.

While the design process management research field already developed methodologies for effectively communicating design processes, industry has not widely adopted these methodologies. This lack of adoption is not due to the lack of tools capable of effectively communicating design processes. Rather, the lack of adoption stems from the lack of incentive for designers to communicate processes at the instant they are designing. It is not sufficient to have the methodology and tools to effectively communicate process. The act of process communication must also require little effort; it must be efficient.

Design processes consist of organizations exchanging information that lead to digital models of a product. Communication is generally the process of exchange of information between sender and receiver to equalize information on both sides. Designers communicate processes by exchanging information that describes how professionals exchange information. While the design process management field effectively but not efficiently communicates design processes, the project information management field develops methods for efficient exchange of information, but not effective process communication. This gap between the two fields motivated both the practical and theoretical development of the Design Process Communication Methodology (DPCM). DPCM consists of elements that represent and contextualize processes and methods that describe how designers capture and use these processes by interacting with a computer. As a result of these elements and methods, DPCM can be characterized as computable, embedded, modular, personalized, scalable, shared, social, and transparent.

Industry struggles to efficiently implement design process management methodologies aimed at improving communication of design processes. Therefore, there is a need for a tool for effective and efficient design process communication. Preferably, such a tool would effectively and efficiently collaborate within projects, share processes between projects, and facilitate the understanding of processes across projects.

SUMMARY OF THE INVENTION

Embodiments of the present invention introduce a tool that is a combination between a file sharing tool and a process modeling tool that enables project teams to exchange and organize information as nodes in a process map in addition to a folder directory. It enables visualization of the dependencies between information as designers work. Embodiments of the present invention provide an opportunity for both effective and efficient process communication. Among other things, the present invention provides a process communication web tool where individuals exchange and organize files as nodes in information dependency maps in addition to folder directories.

An embodiment of the invention is implemented in a web browser that facilitates the visualization of dependencies between documents and situations where changes in one document or project can affect another. In such an embodiment, the user is presented with two personalized home page windows: a hierarchy view and a graph view. The hierarchy view is used to navigate through a hierarchy of documents. The graph view is used to graphically display certain document dependencies and is further used to graphically display changes to any dependencies.

DETAILED DESCRIPTION

Figure 1:
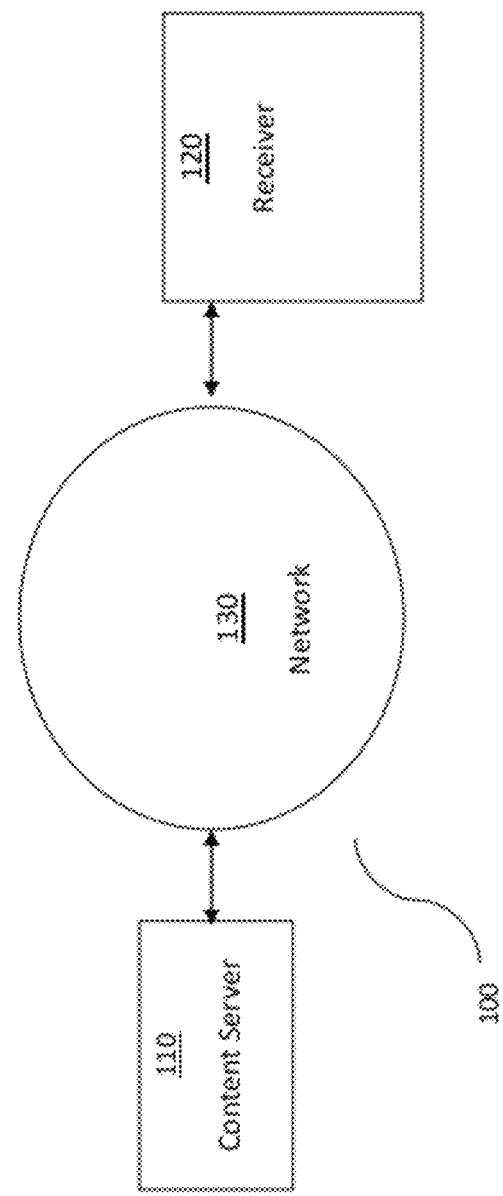
FIG. 1 is a schematic view of a networked system on which the present invention can be practiced.

Among other things, the present invention relates to methods, techniques, and algorithms that are intended to be implemented in a digital computer system. By way of overview that is not intended to be limiting, digital computer system 100 as shown in FIG. 1 will be described. Such a digital computer or embedded device is well-known in the art and may include variations of the below-described system.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

FIG. 1 depicts an exemplary networked environment 100 in which systems and methods, consistent with exemplary embodiments, may be implemented. As illustrated, networked environment 100 may include a content server 110, a receiver 120, and a network 130. The exemplary simplified number of content servers 110, receivers 120, and networks 130 illustrated in FIG. 1 can be modified as appropriate in a particular implementation. In practice, there may be additional content servers 110, receivers 120, and/or networks 130.

In certain embodiments, a receiver 120 may include any suitable form of multimedia playback device, including, without limitation, a computer, a gaming system, a smart phone, a tablet, a cable or satellite television set-top box, a DVD player, a digital video recorder (DVR), or a digital audio/video stream receiver, decoder, and player. A receiver 120 may connect to network 130 via wired and/or wireless connections, and thereby communicate or become coupled with content server 110, either directly or indirectly. Alternatively, receiver 120 may be associated with content server 110 through any suitable tangible computer-readable media or data storage device (such as a disk drive, CD-ROM, DVD, or the like), data stream, file, or communication channel.

Network 130 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

One or more components of networked environment 100 may perform one or more of the tasks described as being performed by one or more other components of networked environment 100.

Figure 2:
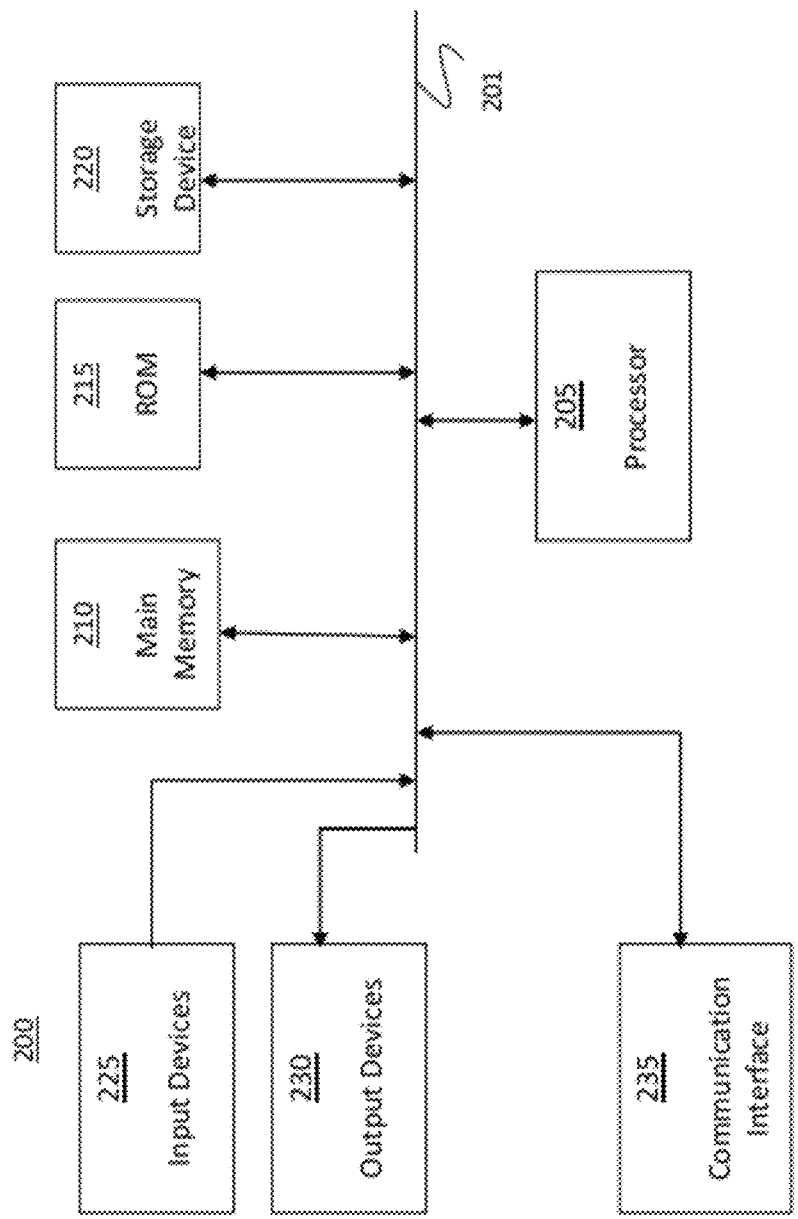
FIG. 2 is a schematic view of a computer system on which the present invention can be practiced.

FIG. 2 is an exemplary diagram of a computing device 200 that may be used to implement aspects of certain embodiments of the present invention, such as aspects of content server 110 or of receiver 120. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Moreover, processor 205 may include processors with multiple cores. Also, processor 205 may be multiple processors. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network, such as network 130 as shown in FIG. 1.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 130 shown in FIG. 1, such as Microsoft's Internet Explorer browser, Google's Chrome browser, Mozilla's Firefox browser, PalmSource's Web Browser, Google's Chrome browser or any other commercially available or customized browsing or other application software capable of communicating with network 130. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 130. For example, source data or other information received from devices connected to the network 130 may be output via the browser. Also, both the browser and the browser assistant are capable of performing operations on the received source information prior to outputting the source information. Further, the browser and/or the browser assistant may receive user input and transmit the inputted data to devices connected to network 130.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or An embodiment of the present invention provides a process-based information communication web tool. In an embodiment, design teams exchange digital information by organizing files according to information dependencies as opposed to traditional folder hierarchies. Organizational Science, Human Computer Interaction, and Process Modeling research fields point to this need for a process-based information communication environment. This embodiment provides an environment that is computable, distributed, embedded, modular, personalized, scalable, shared, social, transparent, and usable. An embodiment of the present invention is described in the context of a university building design project.

In a traditional environment, mechanical engineers had to decide how to assign multiple heating/cooling technologies to various building zones. For example, predicting how heating/cooling options perform with respect to multiple goals required the design team to synthesize information from multiple tools. Comprehending these complex decisions is frequently difficult just within mechanical engineering, but the decisions also impact and are impacted by other disciplines. The owners and designers were not able to systematically consider the complex impacts of one decision on multiple disciplines. Design teams also struggled to maintain consistency between files. Design teams struggled to comprehend and manage their information dependencies; they struggled to collaborate within the project team.

In another traditional environment, university stakeholders expressed the importance of material responsibility when choosing structural systems. The structural engineer created schematic structural models of steel and concrete options. Despite a three-dimensional object-oriented model and a database of the environmental impacts of materials, the structural engineer was unable to find a process for conducting an environmental impact analysis. But researchers in California and engineers from the same company in Australia had already successfully performed this process. In this case, teams struggled to share advantageous processes across projects.

In another traditional situation, in order to inform the design of the louvers on the university building, daylighting consultants created video simulations of sunlight moving across a space. The consultants used the architect's building information model. But the process for utilizing the model in the daylighting simulation was inefficient. Yet no one developed an improved process. Individual consultants are not incentivized to invest time in process improvement. Their tools do not track their process (and the resulting inefficiency), foster a community to improve the process, nor provide transparent access to other processes on which to make improvements. Managers lack a method for understanding process across the firm/industry and therefore, a monetary justification for encouraging development of alternatives.

In an environment that implements the present invention, much critical information (e.g., change information) is conveyed across individuals and teams to improve the overall efficiencies of a large project. For example, in the university building project, the mechanical engineering team can use an embodiment of the present invention to collaborate around their digital files.

Figure 3:
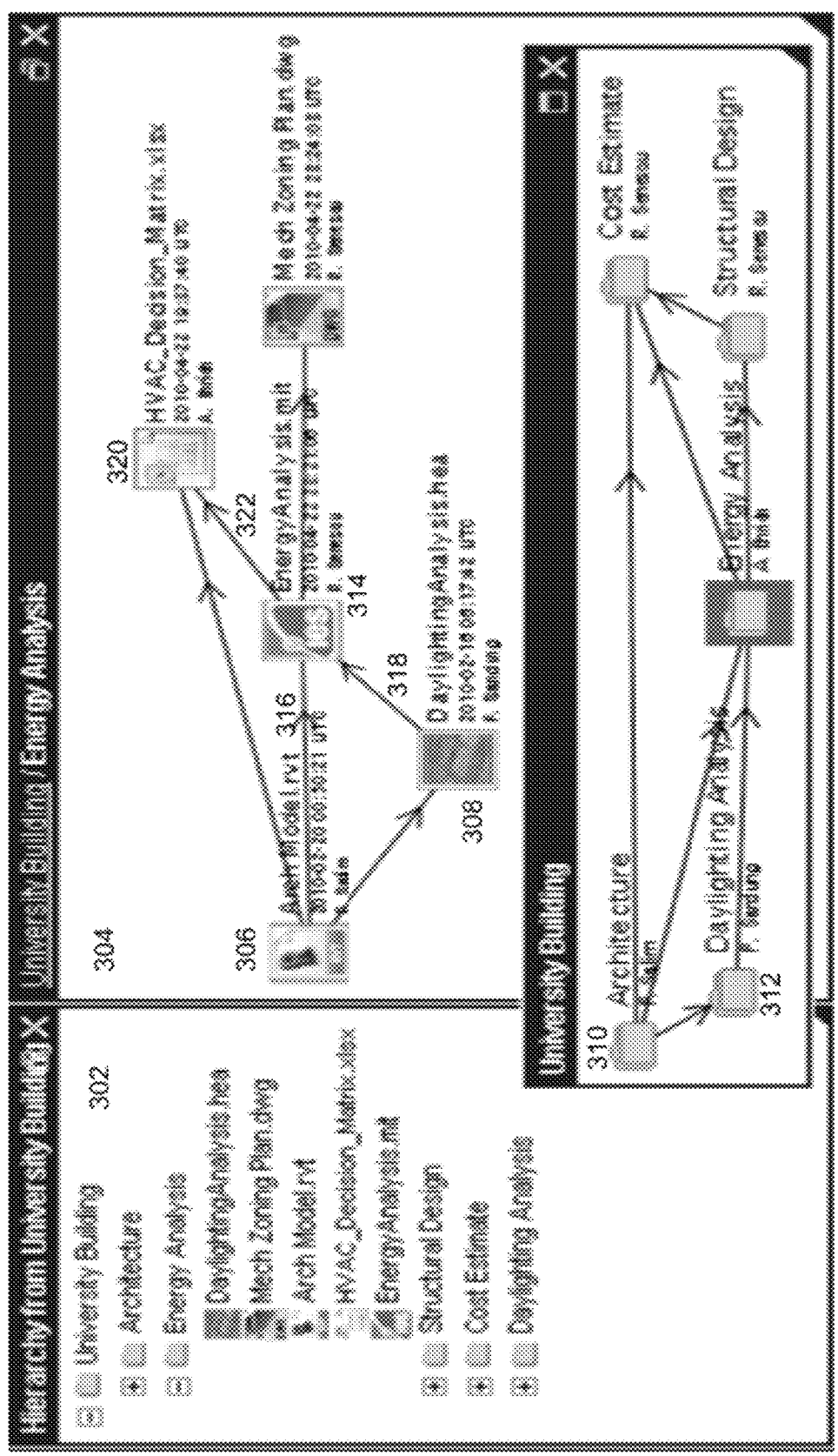
FIG. 3 is a graphical user interface according to an embodiment of the present invention.

Shown in FIG. 3 is a graphical user interface (GUI) for an embodiment of the present invention. This embodiment of the invention is implemented in a web browser that facilitates the visualization of dependencies between documents and situations where changes in one document or project can affect another. In this embodiment, the environment is limited to authorized users. In such an embodiment, access is provided by providing appropriate credentials such as a login name and password. In the embodiment shown in FIG. 3, after logging in, the user is presented with two personalized home page windows: a hierarchy view 302 on the left third of the screen and a graph view 304 on the right two thirds. In the embodiment shown, hierarchy view 302 is used to navigate through a hierarchy of documents. In the graph view, graph view 304 is used to graphically display certain document dependencies and is further used to graphically display changes to any dependencies.

For example, in a case where a mechanical engineer wants to use a Revit Architecture model 306 and a Daysim daylighting analysis as input to an energy analysis. The engineer navigates through folder hierarchies to the appropriate process level (via the hierarchy 302 or graph view 304) of the architecture 310 and daylighting models 312. In this embodiment, the mechanical engineer double clicks on each file 306 and 308 to open them on his desktop. In this example, the mechanical engineer imports the Revit model 306 into his energy analysis tool. Looking at the daylighting analysis results 308, the mechanical engineer may manually enter the energy required for artificial lighting into the energy analysis tool. Continuing with this example, after completing the energy analysis, he double clicks in the graph view 304 to create a node and uploads the energy analysis file 314 to that node. Because he used the architecture model and daylighting analysis as input to the energy analysis, he also draws dependency arrows 316 and 318 from those two nodes to the new energy analysis node to represent this dependency. Continuing with the example, now that the energy analysis 314 is complete, he uses the results to create a decision matrix 320 in Microsoft Excel. He uploads the Excel file 320 to a new node and draws an arrow 322 to it.

In a situation where a new energy analysis file 314 is uploaded, for example, the decision matrix file is no longer up-to-date. An embodiment of the present invention visually represents this condition by highlighting the Excel file 320 because it was created based on a now out-dated energy analysis file 314. In another embodiment of the invention, the changed file 314 is also highlighted as is the dependency arrow 322. In yet another embodiment of the invention, textual annotation is provided that indicates where the changes were made. This can be important where manual changes are made. In yet another embodiment of the invention, an automated process is implemented to implement the changes in the affected files.

Using embodiments of the present invention a design process, for example, can be made transparent to the entire project team so that they can comprehend information relationships, consider tradeoffs, and make related information consistent. Importantly, the present invention is not limited to design processes. Indeed, the present invention can be implemented in many scenarios where changes is one document may affect other documents.

Using the present invention, consultants and their managers, for example, can better understand their processes so that they can identify popular inefficient processes and invest in improvement.

Figure 4:
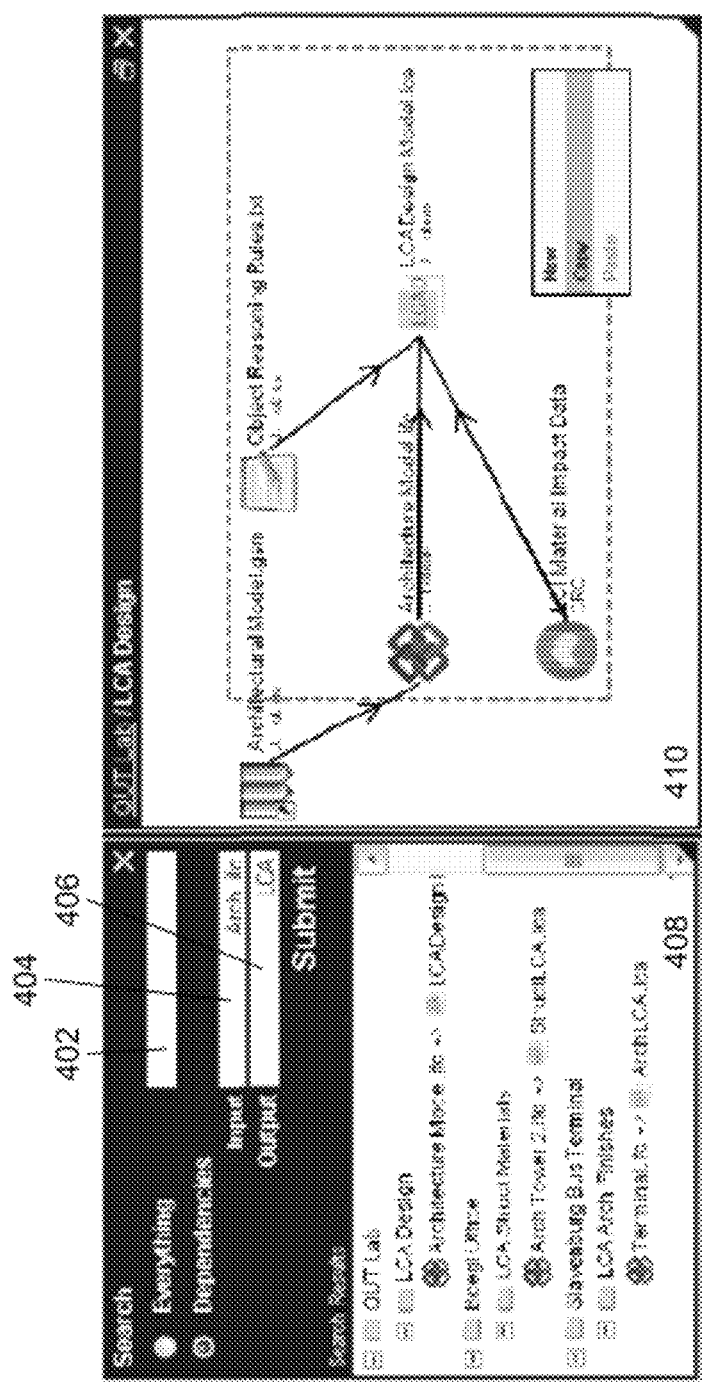
FIG. 4 is a graphical user interface of a search function according to an embodiment of the present invention.

In another embodiment of the present invention as shown in FIG. 4, a search function is provided that allows a user to perform searches on files names or their contents (see box 402). In another embodiment, a search function is provided that allows a user to perform searches on file names and their dependencies. For example, box 404 is provided to indicate a file name for which there is input and box 406 is provided to indicate a file name for which there is output. Search results can be provided in a hierarchy view 408 or graph view 410. The particular example shown in FIG. 4 displays results for Input: Arch.ifc and Output: LCA.

Figure 5:
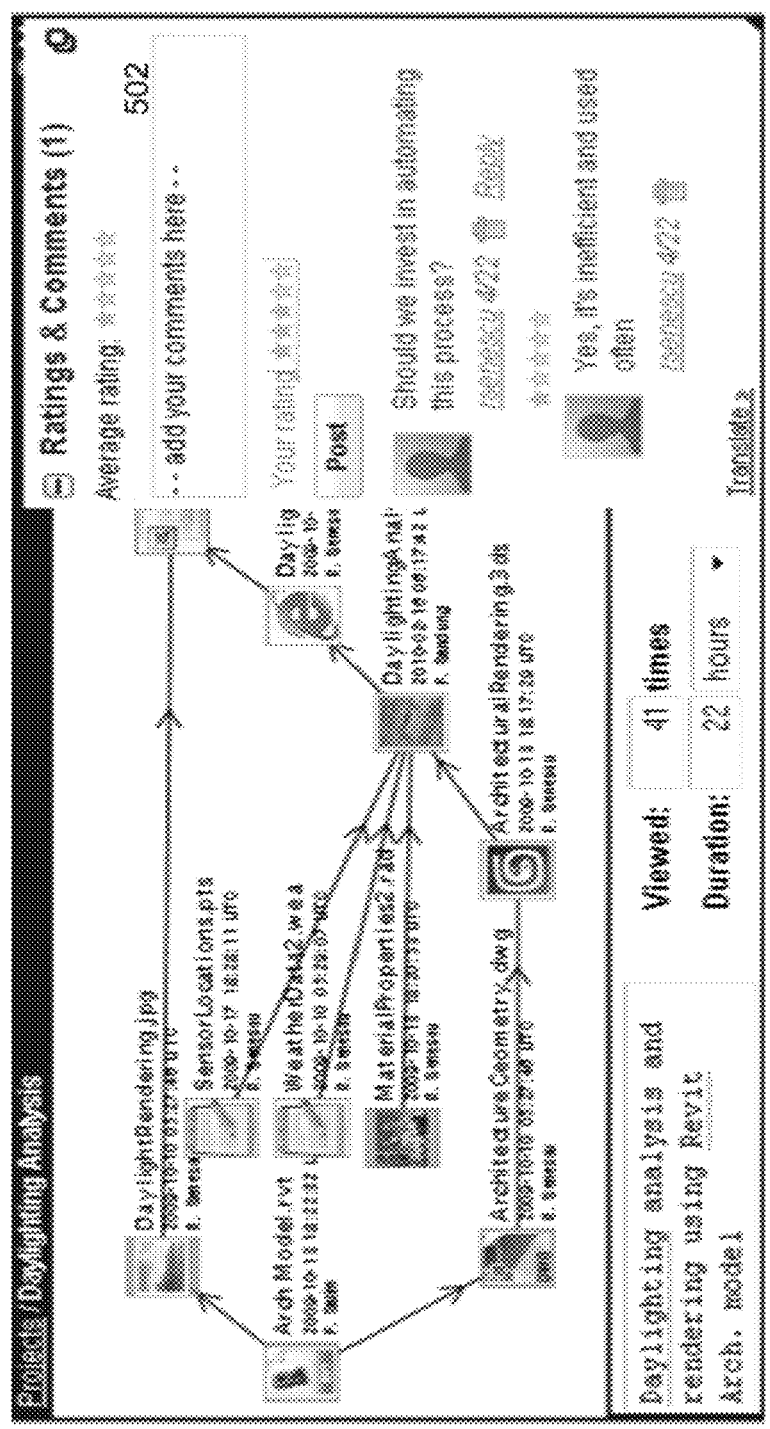
FIG. 5 is a graphical user interface of a discussion function according to an embodiment of the present invention.

Another embodiment of the present invention provides a process-centric discussion forum through window 502 as shown in FIG. 5. As shown, users can discuss and rate processes, among other things. This discussion forum through window 502 provides the opportunity to discuss where the firm should invest in improvement, for example.

Much more information could be shared to facilitate a collaborative project as would be understood by one of ordinary skill in the art.

An embodiment of the present invention is provided as a browser based interface. In such an embodiment, the browser based interface is used to upload files from a user's computer to a remote server by use of graph view 304, for example. Such an action creates a node, for example, as shown in FIG. 3 for file 306. Using the graph view, dependencies to other files are indicated with arrows (e.g., arrow 316). Changes to files and their dependencies are shown in graph view 304 by changes in color or other graphical ways. Shown in FIG. 6 are exemplary methods, according to embodiments of the present invention for performing some of these tasks.

Figure 6:
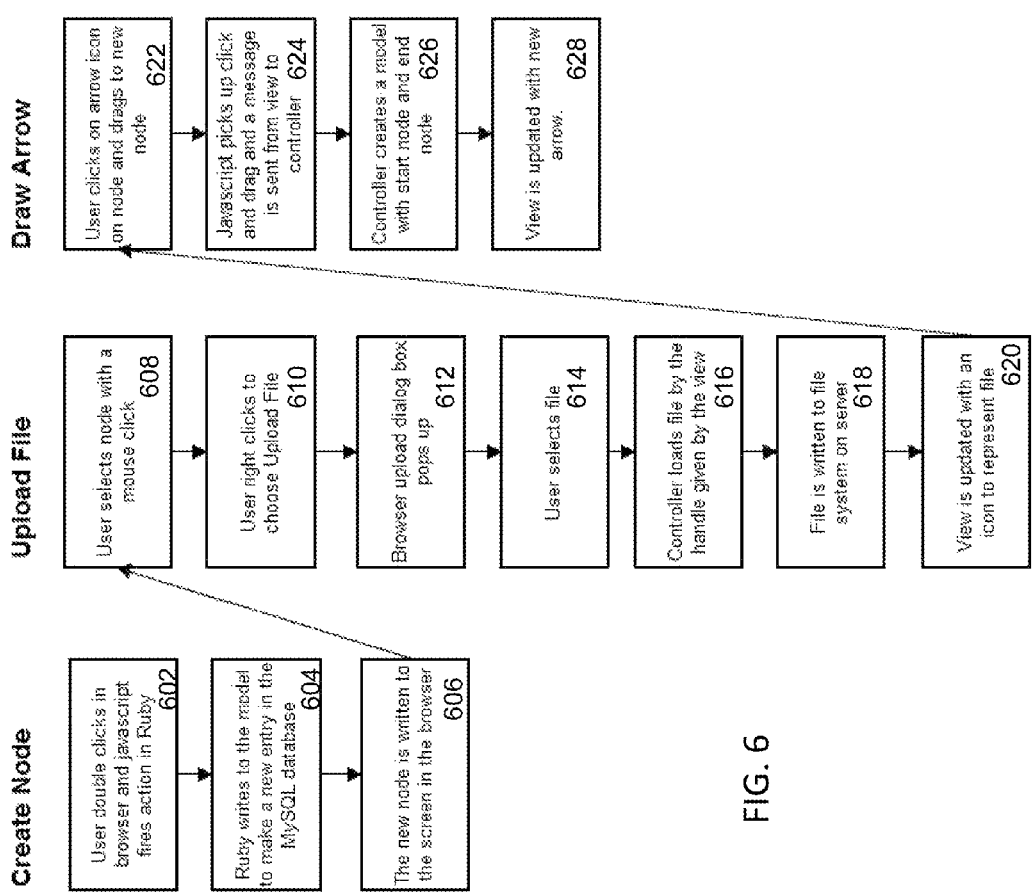
FIG. 6 is a flowchart of methods according to an embodiment of the present invention.

As shown in FIG. 6, a node (e.g., a file) is created by a user double-clicking in the graph view in a browser (step 602). As implemented in an embodiment, a specialized javascript fires an action in Ruby.

An embodiment of the present invention was implemented in Ruby on Rails 2.3.2 using MySQL 5.0 running on a Mongrel web application server. In such an embodiment, the interface is rendered using Scalable Vector Graphics (SVG), an XML-based language for describing graphics on web browsers. Most of the software coding was performed by David J. Anderson.

JavaScript is a prototype-based scripting language that is dynamic and has powerful functionality. It is a multi-paradigm language, supporting object-oriented, imperative, and functional programming styles. JavaScript was formalized in the ECMAScript language standard and is primarily used in the form of client-side JavaScript, implemented as part of a Web browser in order to provide enhanced user interfaces and dynamic websites. This enables programmatic access to computational objects within a host environment. JavaScript uses syntax influenced by that of C. JavaScript copies many names and naming conventions from Java, but the two languages are otherwise unrelated and have different semantics.

Ruby is a dynamic, reflective, general-purpose object-oriented programming language that combines syntax inspired by Perl with Smalltalk-like features. Ruby supports multiple programming paradigms, including functional, object oriented, imperative and reflective. It also has a dynamic type system and automatic memory management; it is therefore similar in varying respects to Smalltalk, Python, Perl, Lisp, Dylan, Pike, and CLU. The currently-standard 1.8.7 implementation is written in C, as a single-pass interpreted language. The specifications of Ruby language are currently being developed by the Open Standards Promotion Center of the Information-Technology Promotion Agency (a Japanese government agency) for submission to the Japanese Industrial Standards Committee and then further on to the International Organization for Standardization. Although javascript and Ruby are used in the embodiment shown, one of ordinary skill in the art could implement the present invention in other forms.

In step 604, Ruby writes to the model being used to make a new entry in the MySQL database that stores the information used in this embodiment of the present invention. MySQL is a relational database management system (RDBMS) that runs as a server providing multi-user access to a number of databases. The MySQL development project has made its source code available under the terms of the GNU General Public License, as well as under a variety of proprietary agreements. MySQL was owned and sponsored by a single for-profit firm, the Swedish company MySQL AB, now owned by Oracle Corporation. Free-software-open source projects that require a full-featured database management system often use MySQL. For commercial use, several paid editions are available, and offer additional functionality. Applications which use MySQL databases include: TYPO3, Joomla, WordPress, MyBB, phpBB, Drupal and other software built on the LAMP software stack. MySQL is also used in many high-profile, large-scale World Wide Web products. Although MySQL is used in the embodiment shown, one of ordinary skill in the art could implement the present invention in other forms.

In step 606, the new node is displayed to the screen in the browser, for example, in the graph view. At this point the node is created.

Having created a node, a user can then proceed to upload a file by initiating step 608 where the user selects a node with a mouse click. Such mouse click initiates the presentation of a menu to the user form which a selection is made to upload a file (step 610). At step 612, a browser upload dialog box is presented to the user. From the dialog box, the user selects a desired file at step 614. Then at step 616, a controller loads the file form the user's computer to a remote server using the information provided in step 614. The file is written to the server at step 618. A browser view is then updated at step 620 with an icon to represent the file. In an embodiment, different icons are used to represent different types of files. In another embodiment, the user can control the icons that are used.

With the multiple files uploaded and graphically represented, dependencies can be shown by, for example, arrows. Arrows are created starting at step 622 where a user click on an arrow icon represented on a node that was previously created. The user then drags the arrow to another node. At step 624, according to an embodiment, a javascript recognizes the click and drag and a message is sent to the controller. At step 626, the controller creates a model with a start node and an end node. At step 628, the graphical view is updated with the newly created arrow.

Importantly, the steps shown in FIG. 6 need not be performed in the steps shown. Indeed, they can be performed in any order desired. For example, a user may desire to create all his desired nodes at one time by performing steps 602-606 before proceeding to upload the files and draw arrows with their dependencies. One of ordinary skill in the art understands these and many other variations.

Figure 7:
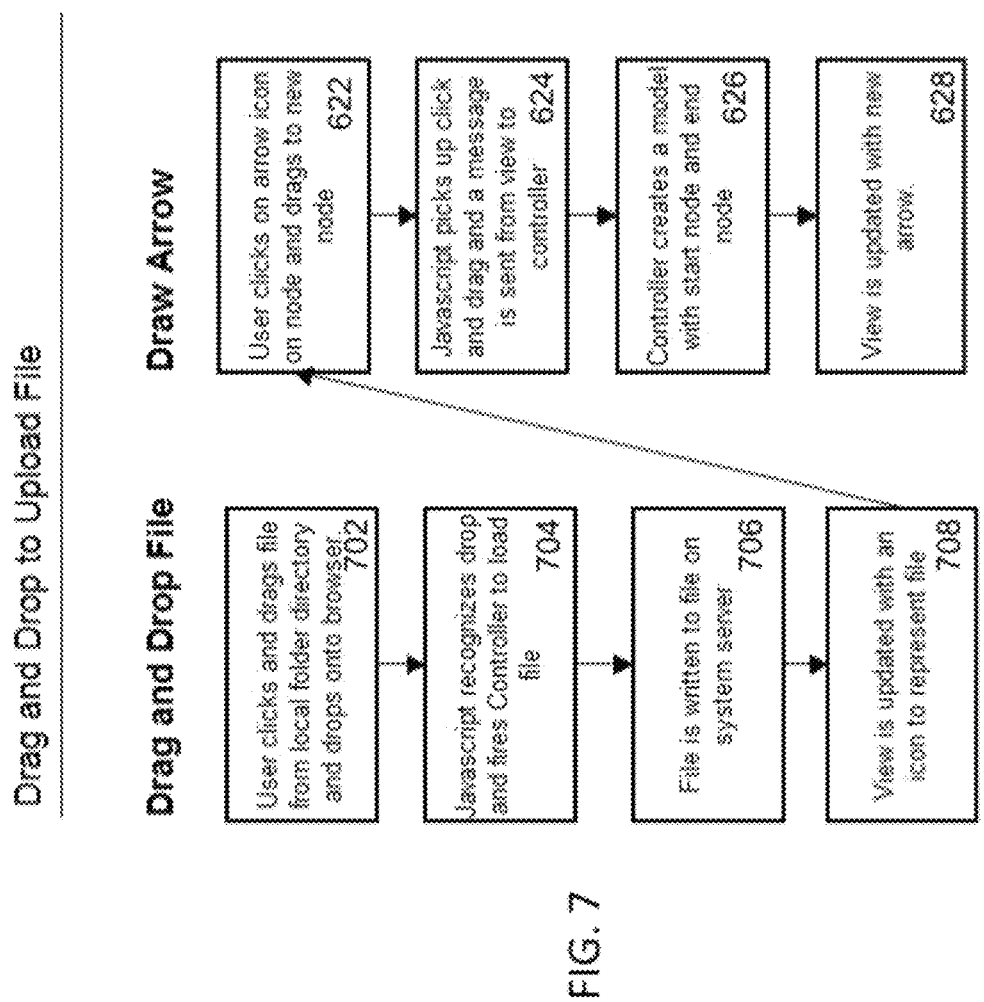
FIG. 7 is a flowchart of methods according to an embodiment of the present invention.

Shown in FIG. 7 is embodiment of the invention for using drag and drop techniques to upload a file. In this embodiment, a user clicks and drags a file from a local folder directory and drops it onto the graph view of an embodiment of the invention as shown in step 702. A javascript recognizes the drop and fires the controller to load the file at step 704. The file is written to the server at step 706. And at step 708, the browser view is updated with an icon to represent the dropped file. The steps shown for drawing an arrow in FIG. 7 are the same as was shown for FIG. 6.

Figure 8:
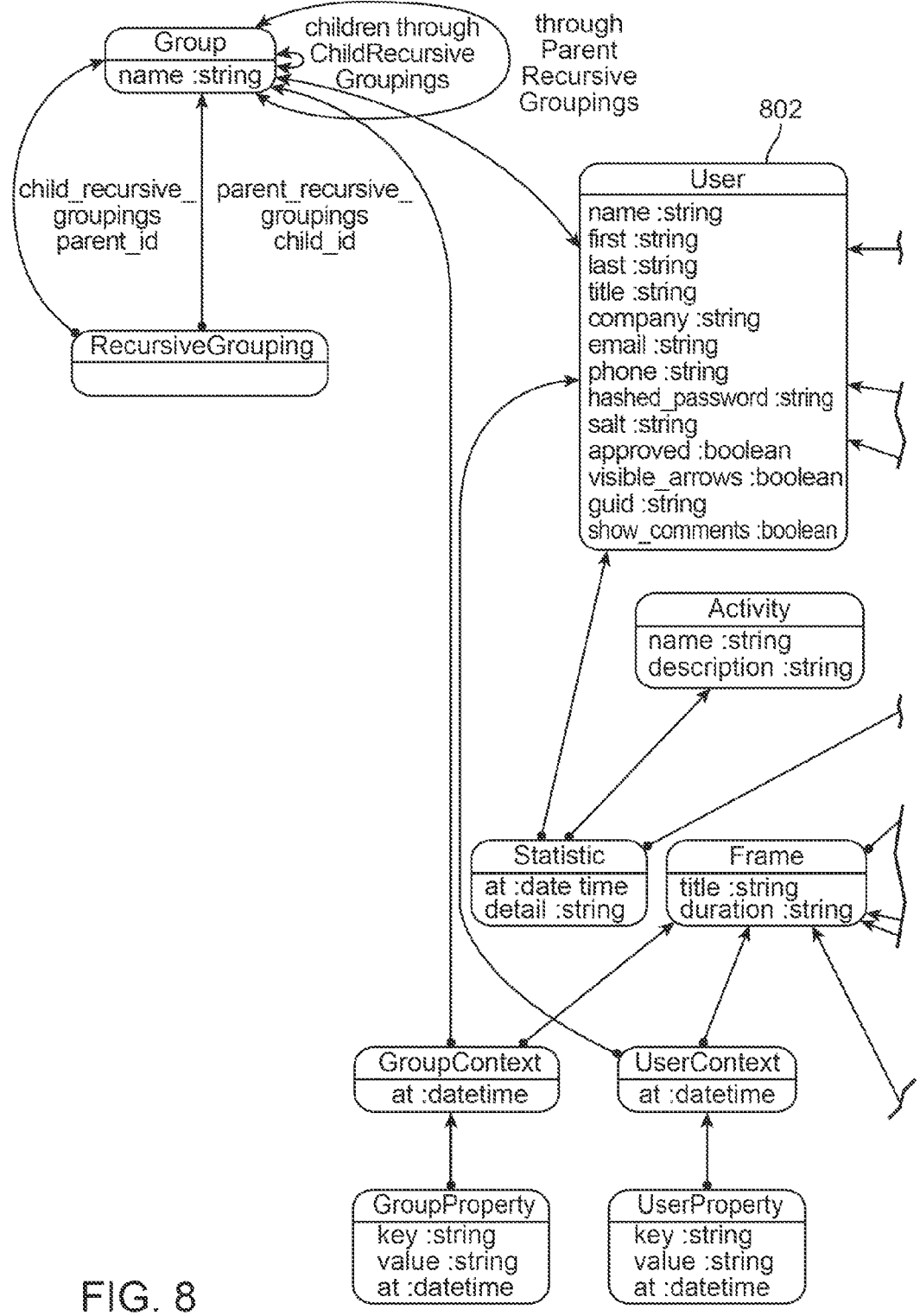
FIG. 8 is a representation of data structures according to an embodiment of the present invention.
Figure 8:
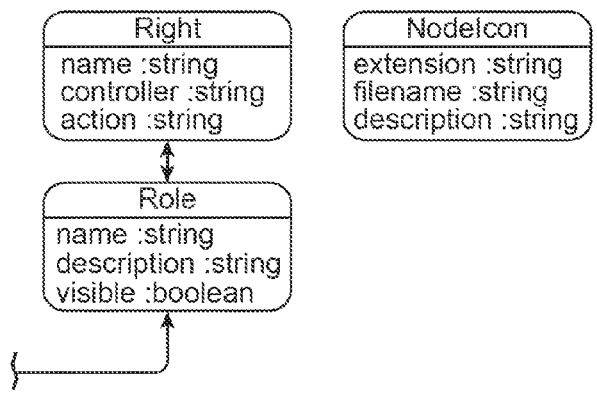
Figure 8:
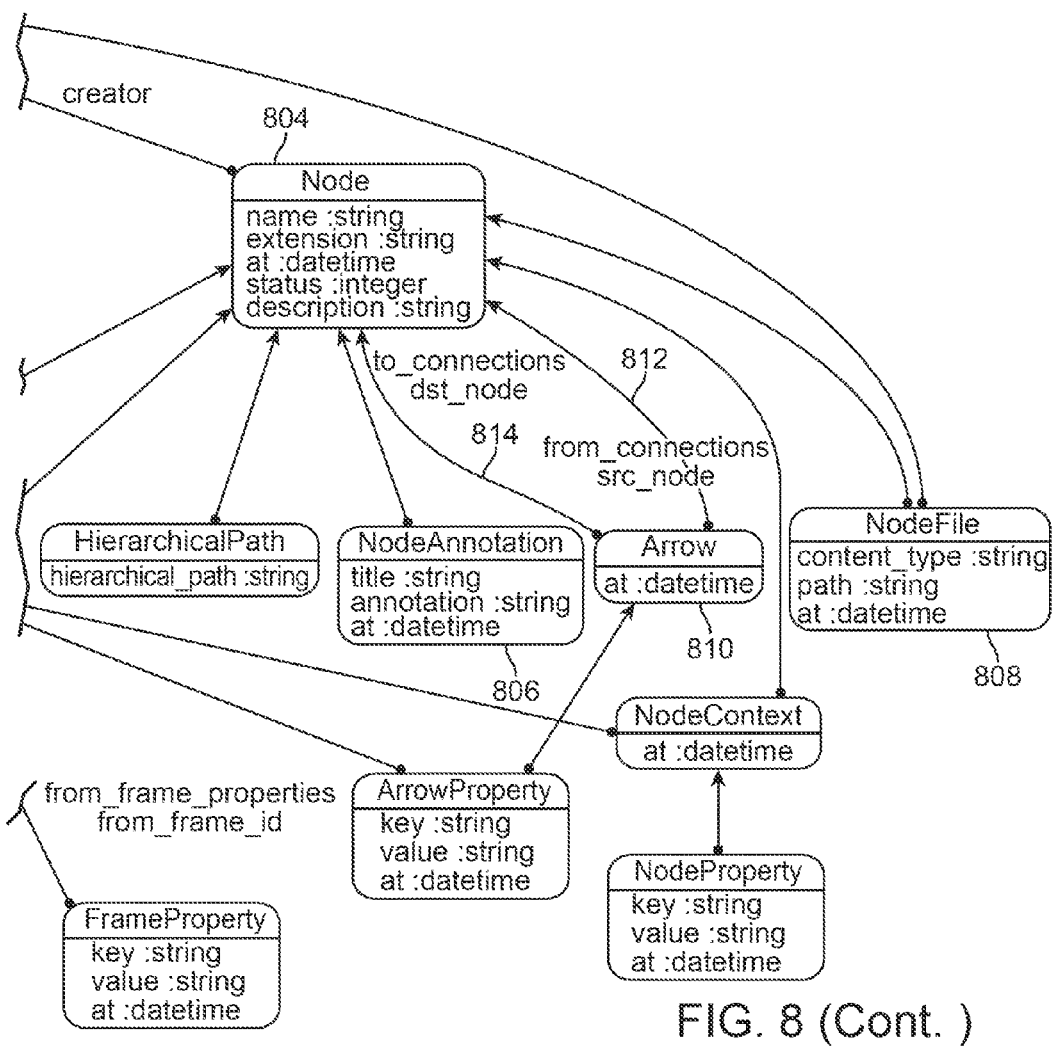

Much information is collected in the MySQL database as used in an embodiment of the present invention. Shown in FIG. 8 are the data structures according to an embodiment of the invention. For example, for authorized users information as shown in User block 802 is maintained including name, company, email, and other information. As described above, a user can create a node. Shown in Node block 804 is certain of the information that can be maintained for a node including the name of the node, the extension, a time stamp, a status indicator, and a description. In an embodiment, the status indicator is used to represent whether changes have been made. Other annotations for the node can be retained as shown for NodeAnnotation block 806 including title, a free text annotation string, and a time stamp for the annotation. As file is associated with a node. Shown in NodeFile block 808 is information that can be maintained for such a file. As shown, the content_type is stored as well as a path and time stamp. File dependencies were described as being shown by arrows. From-arrows 814 and to-arrows 816 can extend for each node (see Node block 804). For each such arrow, a time stamp is stored (see Arrow block 810).

The data structures as shown in FIG. 8 are only exemplary. Indeed, one of ordinary skill in the art understands the flexibility of databases and the wealth of information that can be stored as desired.

Embodiments of the present invention promote collaboration by making information relationships transparent, so entire teams can better consider multi-disciplinary decision tradeoffs. Embodiments of the present invention permit process knowledge sharing with minimal process documentation effort and little management. Also, the present invention provides a platform for firms and industries to understand their processes and invest and distribute process improvements, such as software interoperability solutions.

It should be appreciated by those skilled in the art that the specific embodiments disclosed above may be readily utilized as a basis for modifying or designing other techniques for carrying out the same purposes of the present invention. It should also be appreciated by those skilled in the art that such modifications do not depart from the scope of the invention as set forth in the appended claims.

We claim:

1. A method for visualizing changes in digital data using a data visualization system comprising a processor and a memory connected to the processor via a data bus, the method comprising:
   receiving a first metadata for a first source, wherein the first metadata includes information relating to the first source;
   receiving a second metadata for a second source, wherein the second metadata includes information relating to the second source;
   creating a first node associated with the first source, wherein the first node is created within a dependency graph;
   creating a second node associated with the second source, wherein the second node is created within the dependency graph;
   associating first digital information with the first node, wherein the first digital information includes content of a first file type, the first file type being associated with a first software application;
   associating second digital information with the second node, wherein the second digital information includes content of a second file type, the second file type being associated with a second software application;
   rendering a first graphical element indicating the first node;
   rendering a second graphical element indicating the second node;
   receiving input for a dependency relationship between the first digital information and the second digital information;
   rendering a relational graphical element indicating the dependency relationship;
   receiving an indication that the first digital information has changed;
   altering the first graphical element to indicate that the first digital information has changed;

determining that the second digital information is out-of-date based on the dependency relationship and the received indication that the first digital information has changed; and altering the second graphical element to indicate that the second digital information is out-of-date.

2. The method of claim 1, further comprising receiving the first and second digital information.

3. The method of claim 1, wherein the first metadata and second metadata include status information.

4. The method of claim 3, wherein the indication that the first digital information has changed is stored within the first metadata.

5. The method of claim 1, wherein the first metadata includes a name for the first digital information.

6. The method of claim 1, wherein the second metadata includes a name for the second digital information.

7. The method of claim 1, wherein the relational graphical element includes an arrow between the first digital information and the second digital information.

8. The method of claim 7, wherein a direction of the arrow indicates a manner of dependency between the first digital information and the second digital information.

9. The method of claim 8, wherein altering the first graphical element to indicate that the first digital information has changed is indicated by changing a color of the first graphical element.

10. The method of claim 1, wherein the indication that the first digital information has changed is determined by comparing a first version of the first digital information to a second version of the first digital information.

11. The method of claim 1, wherein the first digital information is an electronic file.

12. The method of claim 1, wherein the second digital information is an electronic file.

13. The method of claim 1, wherein the first software application is different from the second software application.

14. The method of claim 1, wherein the first metadata includes information indicating the first file type.

15. The method of claim 1, wherein the second metadata includes information indicating the second file type.

16. A non-transitory machine readable medium containing processor instructions, where execution of the instructions by a processor causes the processor to perform a process comprising:

receiving a first metadata for a first source, wherein the first metadata includes information relating to the first source;

receiving a second metadata for a second source, wherein the second metadata includes information relating to second source;

creating a first node associated with the first source, wherein the first node is created within a dependency graph;

creating a second node associated with the second source, wherein the second node is created within the dependency graph;

associating first digital information with the first node, wherein the first digital information includes content of a first file type, the first file type being associated with a first software application;

associating second digital information with the second node, wherein the second digital information includes content of a second file type, the second file type being associated with a second software application;

rendering a first graphical element indicating the first node;

rendering a second graphical element indicating the second node;

receiving input for a dependency relationship between the first digital information and the second digital information;

rendering a relational graphical element indicating the dependency relationship;

receiving an indication that the first digital information has changed;

altering the first graphical element to indicate that the first digital information has changed;

determining that the second digital information is out-of-date based on the dependency relationship and the received indication that the first digital information has changed; and altering the second graphical element to indicate that the second digital information is out-of-date.

17. The non-transitory computer-readable medium of claim 16, further comprising receiving the first and second digital information.

18. The non-transitory computer-readable medium of claim 16, wherein the first metadata and second metadata include status information.

19. The non-transitory computer-readable medium of claim 18, wherein the indication that the first digital information has changed is stored within the first metadata.

20. The non-transitory computer-readable medium of claim 16, wherein the first metadata includes a name for the first digital information.

21. The non-transitory computer-readable medium of claim 16, wherein the second metadata includes a name for the second digital information.

22. The non-transitory computer-readable medium of claim 16, wherein the relational graphical element includes an arrow between the first digital information and the second digital information.

23. The non-transitory computer-readable medium of claim 22, wherein a direction of the arrow indicates a manner of dependency between the first digital information and the second digital information.

24. The non-transitory computer-readable medium of claim 23, wherein altering the first graphical element to indicate that the first digital information has changed is indicated by changing a color of the first graphical element.

25. The non-transitory computer-readable medium of claim 16, wherein the indication that the first digital information has changed is determined by comparing a first version of the first digital information to a second version of the first digital information.

26. The non-transitory computer-readable medium of claim 16, wherein the first digital information is an electronic file.

27. The non-transitory computer-readable medium of claim 16, wherein the second digital information is an electronic file.

28. A computing device comprising:
a data bus;
a memory unit coupled to the data bus;
a processing unit coupled to the data bus and configured to:
receive a first metadata for a first source, wherein the first metadata includes information relating to the first source;
receive a second metadata for a second source, wherein the second metadata includes information relating to the second source;

create a first node associated with the first source, wherein the first node is created within a dependency graph;

create a second node associated with the second source, wherein the second node is created within the dependency graph;

associate first digital information with the first node, wherein the first digital information includes content of a first file type, the first file type being associated with a first software application;

associate second digital information with the second node, wherein the second digital information includes content of a second file type, the second file type being associated with a second software application;

render a first graphical element indicating the first node;

render a second graphical element indicating the second node;

receive input for a dependency relationship between the first digital information and the second digital information;

render a relational graphical element indicating the dependency relationship;

receive an indication that the first digital information has changed;

alter the first graphical element to indicate that the first digital information has changed;

determine that the second digital information is out-of-date based on the dependency relationship and the received indication that the first digital information has changed; and alter the second graphical element to indicate that the second digital information is out-of-date.

29. A method for visualizing changes in digital data using a data visualization system comprising a processor and a memory connected to the processor via a data bus, the method comprising:

receiving a first metadata for a first file, wherein the first metadata includes a first set of information relating to the first file, the first set of information including a filename, a filename extension, a time stamp, and a status indicator;

receiving a second metadata for a second file, wherein the second metadata includes a second set of information relating to the second file, the second set of information including a filename, a filename extension, a time stamp, and a status indicator;

creating a first node associated with the first file and the first metadata, wherein the first node is created within a dependency graph;

creating a second node associated with the second file and the second metadata, wherein the second node is created within the dependency graph;

associating first digital information with the first node, wherein the first digital information includes content of a first file type, the first file type being associated with a first software application;

associating second digital information with the second node, wherein the second digital information includes content of a second file type, the second file type being associated with a second software application, wherein at least one selected from the group consisting of the first digital information and the second digital information contains a description of a three-dimensional object;

rendering a first graphical element indicating the first node;

rendering a second graphical element indicating the second node;

receiving input for a dependency relationship between the first digital information and the second digital information;

rendering a relational graphical element indicating the dependency relationship;

receiving an indication that the first digital information has changed;

altering the first graphical element to indicate that the first digital information has changed;

determining that the second digital information is out-of-date based on the dependency relationship and the received indication that the first digital information has changed; and altering the second graphical element to indicate that the second digital information is out-of-date.

\* \* \* \* \*